US012731466B2

(12) United States Patent
Ganaparthi et al.

(10) Patent No.: US 12,731,466 B2
(45) Date of Patent: *Sep. 8, 2026

(54) DYNAMIC ALLOCATION AND DISPENSING OF CASH

(71) Applicant: Wells Fargo Bank, N.A., San Francisco, CA (US)

(72) Inventors: Jagadeesh Ganaparthi, Hyderabad (IN); Rameshchandra Bhaskar Ketharaju, Hyderabad (IN); Hari Prasada Raju Kunadharaju, Hyderabad (IN); Govinda Rajulu Nelluri, Hyderabad (IN)

(73) Assignee: WELLS FARGO BANK, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/316,316

(22) Filed: Sep. 2, 2025

(65) Prior Publication Data

US 2026/0038349 A1 Feb. 5, 2026

Related U.S. Application Data

(63) Continuation of application No. 18/791,636, filed on Aug. 1, 2024, now Pat. No. 12,430,994.

(51) Int. Cl.
*G07F 19/00* (2006.01)

(52) U.S. Cl.
CPC .................................. *G07F 19/203* (2013.01)

(58) Field of Classification Search
CPC ...... G07F 19/203; G07F 19/20; G07F 19/201; G07F 19/206; G07F 19/211; G06Q 20/1085
See application file for complete search history.

(56) References Cited

U.S. PATENT DOCUMENTS 10,068,437 B2 9/2018 Burdick
11,600,151 B2 3/2023 Dryer
(Continued)

FOREIGN PATENT DOCUMENTS

CA 2229012 C 5/2002
CN 105719407 A 6/2016
(Continued)

OTHER PUBLICATIONS

The adverse selection effect of corporate cash reserve: Evidence from acquisitions solely financed by stock (Year: 2011).*
(Continued)

*Primary Examiner* — Thien T Mai
(74) *Attorney, Agent, or Firm* — Merchant & Gould P.C.

(57) ABSTRACT

Dynamic allocation of cash. Dispensing of cash by an automatic teller machine (ATM) can be prioritized, e.g., for customers of the financial institution that operate the ATM over non-customers. A request by a customer to hold cash at an automatic teller machine (ATM) for future withdrawal is analyzed using an architecture of artificial intelligence. If the cash hold request is approved, in some examples the requested amount of cash is moved from a first cash rack of the ATM to a second cash rack of the ATM. The requested amount of cash cannot be moved from the second cash rack unless the customer withdraws it from the ATM or unless a time limit for the customer to withdraw the requested amount from the ATM is exceeded.

18 Claims, 4 Drawing Sheets

(56) References Cited

U.S. PATENT DOCUMENTS

| | | | | |
|---|---|---|---|---|
| 11,720,873 | B2 | 8/2023 | Singh | |
| 2008/0091601 | A1 * | 4/2008 | Green | G07F 19/206 235/379 |
| 2018/0285843 | A1 * | 10/2018 | Chaturvedi | G07F 19/211 |
| 2018/0341934 | A1 | 11/2018 | Rodrigues et al. | |
| 2021/0304165 | A1 | 9/2021 | Deluca et al. | |

FOREIGN PATENT DOCUMENTS

| | | | | |
|---|---|---|---|---|
| CN | 113299004 | A | 8/2021 | |
| EP | 1672500 | A2 * | 6/2006 | G07D 11/235 |
| IN | 201814032116 | A | 3/2019 | |
| IN | 202311040230 | A | 7/2023 | |
| JP | 2011107763 | A * | 6/2011 | |
| JP | 2017201557 | A * | 11/2017 | |
| WO | 20220542 | A2 | 1/2022 | |

OTHER PUBLICATIONS

The motives of cash reserve and bidder cash reserve effects (Year: 2014).*

Impact of cash reserve ratio on banks profitability: A study on conventional commercial banks in Bangladesh (Year: 2023).*

Smart: A Many-to-Many Multicast Protocol for ATM (Year: 1997).

* cited by examiner

DYNAMIC ALLOCATION AND DISPENSING OF CASH

BACKGROUND

Automatic Teller Machines (ATMs) are typically operated by financial institutions. An ATM can dispense cash in response to cash withdrawal requests by customers of the financial institution requesting to withdraw cash from transaction accounts managed by the financial institutions, as well as by non-customers. Typically, non-customers will be charged a fee by the financial institution for using the ATM.

SUMMARY

In general terms, the present disclosure relates to dynamically allocating cash held by an ATM and dispensing cash held by the ATM.

In one aspect, the present disclosure relates to an automatic teller machine (ATM), including: a first cash rack; a second cash rack; and a cash dispensing device configured to dispense cash from each of the first cash rack and the second cash rack, wherein the ATM is configured to move an amount of cash from the first cash rack to the second cash rack in response to a request to hold cash for later withdrawal received from an electronic computing device that is remote from the automatic teller machine.

In another aspect, the present disclosure relates to a system for dispensing cash, including: an automatic teller machine (ATM), including: at least one cash rack including a total amount of cash held by the ATM; and a cash dispensing device configured to dispense cash from the at least one cash rack; at least one processor; and non-transitory computer-readable storage encoding instructions which, when executed by the at least one processor cause the system to: receive an input from an electronic computing device that is remote from the ATM, the input including a request to hold for later withdrawal another amount of cash and metadata associated with the request; feed the request and the metadata to a generative adversarial network (GAN); determine, by the GAN, and based on the metadata, the total amount of cash, and the another amount of cash, whether to approve the request; when the GAN approves the request: generate a token; and send the token to the electronic computing device; and send signals to the ATM that cause the ATM to prevent the total amount of cash held by the ATM to drop below the another amount of cash until: i) the token is scanned by the ATM; or ii) a predefined amount of time since the token was generated has elapsed; and when the GAN does not approve the request to withdraw the another amount of cash, send a message to the electronic computing device indicating that the request to withdraw the another amount of cash is denied.

In another aspect, the present disclosure relates to system for dispensing cash, including: an automatic teller machine (ATM) holding a total amount of cash, the ATM including: a first cash rack; a second cash rack; and a cash dispensing device configured to dispense cash from each of the first cash rack and the second cash rack; at least one processor; and non-transitory computer-readable storage encoding instructions which, when executed by the at least one processor cause the system to: receive an input from an electronic computing device that is remote from the ATM, the input including a request to hold for later withdrawal another amount of cash and metadata associated with the request, the metadata including a time that the request was made, a location of the electronic computing device, and a profile of a customer of a financial institution that operates the ATM; select from a plurality of ATMs, based on the metadata and the total amount of cash, the ATM as a selected ATM to hold the another amount of cash; feed the request and the metadata to a generative adversarial network (GAN); determine, by the GAN, whether to approve the request based on: the metadata; the total amount of cash; the another amount of cash; and an output generated by a multi-head attention module, wherein one head of the multi-head attention module processes data associated with the first cash rack and another head of the multi-head attention module processes other data associated with the second cash rack; when the GAN approves the request: generate a token; send the token to the electronic computing device; move the another amount of cash from the first cash rack to the second cash rack based on another output from a support vector machine (SVM), the another output being constrained by a rule defining a range of a gap that must be maintained between a first amount of the total amount of cash held in the first cash rack and a second amount of the total amount of cash held in the second cash rack; send signals to the ATM that cause the ATM to prevent the another amount of cash from moving out of the second cash rack until: i) the token is scanned by the ATM; or ii) a predefined amount of time since the token was generated has elapsed; when the token is scanned by the ATM before the predefined amount of time since the token was generated has elapse, cause the ATM to dispense the another amount of cash from the second cash rack via the cash dispensing device; when the predefined amount of time has elapsed: move the another amount of cash from the second cash rack back to the first cash rack; and disable the token; when the GAN does not approve the request to withdraw the another amount of cash, send a message to the electronic computing device indicating that the request to withdraw the another amount of cash is denied.

Each of these aspects, and other aspects, of the present disclosure, can be implemented in a variety of ways including, for example, in the form of one or more of a computing system, a computing device, a method (e.g., a computer-implemented method), non-transitory computer-readable storage, a plurality of computing devices, and the like.

The details of one or more techniques are set forth in the accompanying drawings and the description below. Other features, objects, and advantages of these techniques will be apparent from the description, drawings, and claims.

DETAILED DESCRIPTION

Figure 1:
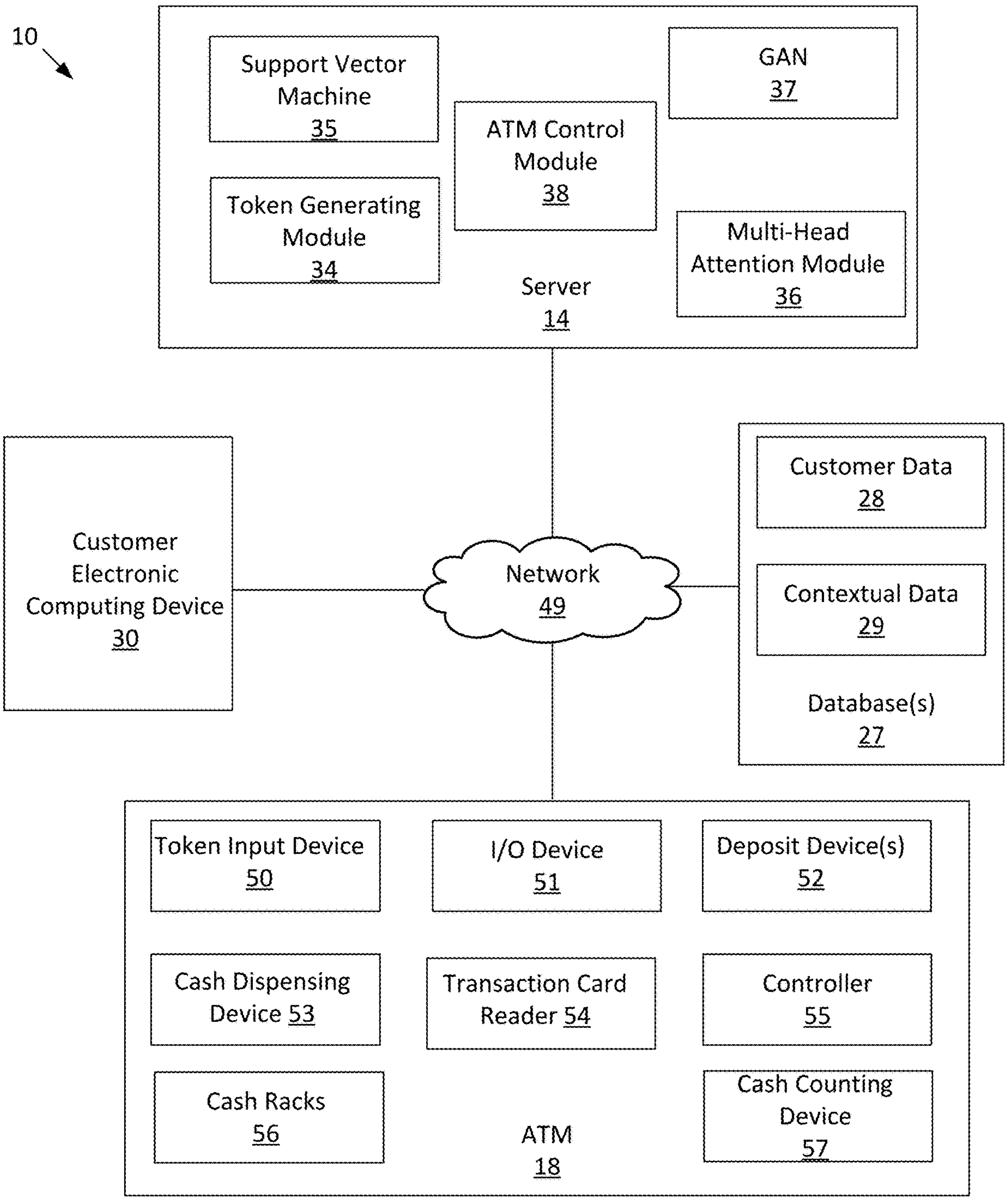
FIG. 1 shows an example dynamic cash allocation and dispensing system.

ATMs are typically operated by financial institutions. For example, a given financial institution can provide an ATM in a physical branch of the financial institution, or at another location where there is likely to be demand for cash withdrawal (e.g., a hospital, an airport, a sports arena, a fairgrounds, etc.). A typical ATM includes an interface for receiving input and providing output, a transaction card reader, a deposit device for receiving deposits, a dispensing cash rack holding a supply of cash for dispensing from the ATM, and a deposit cash rack for holding deposits of cash. Some ATMs may also include a separate rack for holding deposited checks.

A user who wishes to withdraw cash from the ATM typically provides a transaction card that is scanned by the transaction card reader. The ATM determines whether the transaction card account associated with the transaction card is a transaction account managed by the financial institution that operates the ATM. If the transaction account is one managed by the same financial institution as the ATM, the cash withdrawal can proceed without requiring payment of an excess out-of-network fee if the ATM determines that there is adequate balance in the transaction account. If the transaction account is one not managed by the same financial institution as the ATM, the cash withdrawal can proceed if the ATM determines that there is adequate balance in the transaction account only if the user accepts to pay an out-of-network fee for performing the withdrawal.

At any given time, an ATM has a limited cash supply (or balance) from which to dispense cash in response to cash withdrawal requests. Typically, an ATM operates on a first come, first served basis, where cash is dispensed to a user requesting a withdrawal at the ATM as long as the requested amount of cash is available to dispense.

When a user (whether a customer or non-customer) arrives at a typical ATM, the user has no way of knowing if that ATM currently has the cash balance that is needed for the desired withdrawal. Scenarios can occur, for instance, in busy ATM withdrawal areas and/or at busy ATM withdrawal times (e.g., an ATM near a sports arena one hour before a professional sports game is scheduled to commence at the sports arena), in which by the time a user gets their turn in line at the ATM the ATM lacks a sufficient balance to satisfy the withdrawal request, causing inconvenience or harm for the user who was relying on the cash withdrawal. For instance, if the cash was needed to pay for urgent medical treatment at a medical facility located near the ATM, the user may be unable to receive the medical treatment due to the ATM's running out of cash.

The present disclosure can provide one or more advantages over existing ATMs and ATM operations. According to the present disclosure, cash withdrawal requests can be prioritized based on factors other than first-come, first-served. For example, a customer of a financial institution who is not yet physically present at a given ATM operated by that financial institution but would like to withdraw an amount of cash from that ATM in the future can submit a request to the ATM to reserve, or earmark, the desired amount of cash until the customer physically arrives at the ATM.

As will be further detailed below, the present disclosure provides various improvements in the functioning of ATMs.

As the term is used herein, a "customer" is an individual who is a customer of a financial institution seeking to withdraw funds from a transaction account associated with the customer managed by the financial institution via a cash withdrawal from an ATM operated by the financial institution.

As the term is used herein, a "non-customer" is an individual seeking to withdraw funds from a transaction account associated with the customer and not managed by the financial institution via a cash withdrawal from an ATM operated by the financial institution.

As the term is used herein, a "user" can refer to a customer or a non-customer.

As the term is used herein, "transaction account" refers to any account from which a cash withdrawal can be performed via an ATM, such as a checking account, a savings account, a credit card account, and the like.

As the term is used herein, a "transaction card" is a card that encodes (e.g., via a magnetic stripe or an electronic chip) information (e.g., a transaction account number) about a transaction account and can be scanned by an ATM to enable the ATM to dispense cash by withdrawing funds from the associated transaction account.

System Overview

FIG. 1 shows an example dynamic cash allocation and dispensing system 10.

The system 10 includes a server 14, an ATM 18, one or more databases 27, and a customer electronic computing device 30 that are networked together via a network 49. The various devices shown generate, transmit and receive various signals carrying the data and metadata as described herein between different devices within the system 10.

The server 14 can be managed by a financial institution. The server 14 can represent a single server, e.g., that is operated exclusively by a financial institution. Alternatively, the server 14 can include multiple computing devices, with the functionality of the server 14 being distributed across the multiple computing devices using the network 49. For instance, the server 14 can represent a computing cloud that a financial institution accesses to perform functions of the server 14 described herein.

The network 49 can be any suitable network or combination of networks for operably coupling computing devices to one another so that the computing devices can communicate data signals between one another.

The ATM 18 is operated by the financial institution that runs the functionality of the server 14.

The ATM 18 includes a token input device 50. For example, the token input device 50 can be scanner for scanning a quick response (QR) code or a radio frequency identification (RFID) tag.

The ATM 18 includes a in input/output (I/O) device 51. The I/O device 51 can include a touch screen for users to enter commands to operate the ATM 18. The I/O device 51 can include a microphone for the user to utter commands that are received and processed by the ATM 18. The I/O device 51 can include a speaker whereby information can be output by the ATM audibly through the speaker. In some examples, the I/O device 51 can be configured, temporarily, as the token input device 50.

The ATM 18 includes one or more deposit devices(s) 52 such as one or more slots with corresponding feeding mechanisms and/or conveyors for depositing, e.g., cash or checks from exterior to the ATM into the ATM 18.

The ATM 18 includes a cash dispensing device 53, e.g., a slot with a corresponding feeding mechanism and/or conveyor for dispensing cash to the exterior of the ATM 18.

The ATM 18 includes a transaction card reader 54 for reading information (e.g., an account number) of a transaction card. For instance, the transaction card reader 54 can include a chip reader that can read a chip embedded in a transaction card and/or a magnetic stripe reader that can read a magnetic stripe embedded in a transaction card.

The ATM 18 includes cash racks 56. The cash racks 56 store the ATM's cash supply. At any given time that an ATM transaction is not actively occurring, the ATM 18 has a total amount of cash that is stored in the cash racks 56.

The ATM 18 includes a cash counting device 57. The cash counting device 57 is configured to, e.g., count cash deposited into the cash racks 56 of the ATM 18 and count cash that is being dispensed from the cash racks 56 of the ATM 18.

The cash counting device 57, the cash dispensing device 53, and the deposit device(s) 52 are all operatively coupled to the cash racks 56 to enable deposit to the cash racks 56 from the exterior of the ATM 18 and withdrawal of cash from the cash racks 56 to the exterior of the ATM 18.

The ATM 18 includes a controller 55. The controller 55 generates electronic signals, e.g., using one or more microprocessors to control the various operations of the other components of the ATM 18 in response to different events, such as an input via the I/O device 51, an input via the token input device 50, or receipt of a request to hold an amount of cash in the ATM until a later time, and the like. The controller 55 can control various components of the ATM also in response to signals it receives that were generated by the server 14.

The customer electronic computing device 30 can include, for example, a smartphone, a tablet, a smartwatch or other smart wearable technology, a virtual reality device, an augmented reality device, a desktop computer, a transaction card reader, a point-of-sale terminal, and the like. When a customer requests, via the device 30, to hold an amount of cash at the ATM 18, the device 30 is remote (e.g., more than five feet away) from the ATM 18.

The device 30 can support a platform, e.g., a web application or a financial services application, whereby a customer of the financial institution can input credentials that, upon approval, provide via the device 30 access to and the ability to manage aspects of a transaction account managed by the financial institution. For example, a customer can log into their customer account with the financial institution and submit a request via the device 30 to hold an amount of cash at an ATM for future withdrawal. If the request is approved, the server 14 can generate a token that is provided to the device 30. The device 30 can then be used to provide the token to the ATM 18 to gain access to the held cash and enable the ATM 18 to dispense the held cash.

The server 14 stores, or has access via the network 49, to one or more databases 27, that stores customer data 28 for customers of the financial institution. For example, such customer data 28 can include account data about the customer's transaction accounts from which the customer may withdraw cash. The customer data 28 can include information associated with transaction accounts, such as an account number, a type of account (e.g., checking, savings, credit), the name of the account owner, whether the account is a business account or a personal account, user contact information, user login credentials, and the like.

The customer data 28 can also include a customer profile associated with one or more transaction accounts. The customer profile can indicate, for example, a relationship status of the customer with respect to the financial institution, e.g., if the customer is a preferred or premium customer versus a regular customer. The customer profile can also include data about the customer's history of requesting ATM cash holds. Such data can indicate how many times and how frequently such requests have been made by the customer, and how probable it is, based on historical interactions, that the customer will arrive at the ATM within a predefined threshold time (e.g., two hours) from when the request to hold ATM cash is made.

The database(s) 27 also includes contextual data 29. The contextual data 29 can include historical information about different ATMs and fluctuations in cash demands from each individual ATM e.g., based on time of day, time of year, day of the week and so forth. The contextual data 29 can also include a schedule of irregular and/or regular events that may impact cash withdrawal demands at one or more specific ATMs. Such events can include, e.g., sporting events, concerts, or any planned gathering of people near an ATM that may generated higher than average cash demand withdrawal.

The server 14 includes a token generating module 34. The token generating module 34 is configured to generate a token that is then provided to the customer electronic computing device 30 (or to a customer account that can be accessed, together with the token via the customer electronic computing device 30 or another computing device) that enables the customer to withdraw cash from the ATM 18 that the customer previously requested to be held by the ATM 18. The token generating module 34 is configured to generate a token when the artificial intelligence (AI) components of the server 14 grant a customer's request to hold an amount of cash at the ATM 18 based on one or more of requested cash hold data provided by the device 30, metadata provided by the device 30, contextual data 29, current cash supply data for the ATM 18, and/or customer data 28.

The AI components of the server 14 include a generative adversarial network (GAN) 37, a multi-head attention module (MHAM) 36, and a support vector machine (SVM) 35.

The GAN 37, MHAM 36 and SVM 35 (collectively referred to herein as "the AI components") are trained to process the data just described and, based on that data, determine how to control the ATM 18 in response to a request received from the device 30 to hold an amount of cash in the ATM 18.

The AI components of the server 14 provide instructions to the ATM control module 38 based on the AI analysis performed on the relevant data. The ATM control module 38 generates signals based on the instructions it receives. The signals are transmitted to the ATM 18 via the network 49, causing the controller 55 of the ATM 18 to control the various components of the ATM 18 according to the control signals generated by the ATM control module 38.

The GAN 37, for example, is configured to process the various data it receives as input according to one or more algorithms that pit predicted cash supplies of one cash rack (e.g., a main cash rack) of the ATM 18 against predicted cash supplies of another cash rack (e.g., an alternate cash rack) of the ATM 18 based on the input data and thereby determine whether it makes sense to grant or reject the customer's request to hold an amount of cash at the ATM 18. If the decision is to grant the customer's request, the GAN also can be configured, based on the various input data to set a time limit on the validity of the token generated token generating module. That is, the GAN can optimize how long the ATM 18 will hold the amount of cash requested by the customer.

The MHAM 36, for example, can be configured such that one head of the MHAM 36 processes data associated with (e.g., that impacts cash supply of) one of the cash racks 56 (e.g., the main cash rack) and another head of the MHAM processes other data associated with (e.g., that impacts cash supply of) another one of the cash racks 56 (e.g., the alternate cash rack). The outputs of the MHAM 36 are provided to the GAN 37 and/or to the ATM control module 38, which take the output of the MHAM 36 into consideration when determining how to respond to a request to hold an amount of cash in the ATM 18.

The SVM 35, for example, can be configured to optimize a gap in cash supplies between two of the cash racks 56, e.g., between the main cash rack and the alternate cash rack. For example, the SVM 35 can predict outcomes and generate outputs that drive or could drive redistribution of cash between two racks of the cash racks 56 using one or more algorithms constrained by a rule defining a range of a gap that must be maintained between a first amount of cash held in one of the cash racks 56 (e.g., the main rack) and a second amount of cash held in another of the cash racks 56 (e.g., the alternate rack). Such a rule is then taken into consideration by the ATM control module 38 when determining how to respond to a request to hold an amount of cash in the ATM 18.

For example, such a rule can require that cash held for future withdrawal in the alternate cash rack is limited to a range of 10 percent to 20 percent of the amount of cash held in the main cash rack at any given time. When a request to hold cash for future withdrawal is received, the SVM 35 can influence the decision on whether to grant the request (and, if so, for how long) based on the gap between the cash supplies in the different racks at the time of the request, and the anticipated gap if the request is granted and, thereafter, based on a prediction as to when the actual withdrawal will take place, the anticipated other cash withdrawal demands in that timeframe, and the like.

Each of the GAN 37, the MHAM 36 and the SVM 35 are configured to drive, by their respective algorithmic outputs, the ultimate decisions of whether to grant a request to hold cash in the ATM 18 and, if so, for how long. In different scenarios, the AI components can drive the same decision(s), or cut against one another.

The server 14 can be configured such that the GAN 37, the MHAM 36, and the SVM 35 process data and generate outputs (e.g., ATM control recommendations and/or cash supply predictions) independently of one another and provide their outputs to the ATM control module 38. The ATM control module 38 is configured to process the various outputs from the GAN 37, the MHAM 36 and the SVM and generate appropriate ATM control signals to cause the ATM 18 to behave accordingly.

Alternatively, two or more of the GAN 37, the MHAM 36, and the SVM 35 can operate in tandem and provide instructions to the ATM control module 38 accordingly. For example, the parameter inputs to the algorithm(s) of the GAN 37 can include the outputs of the SVM 35 and/or the MHAM 36.

Each of the GAN 37, MHAM 36, and SVM 35 can be trained using training data with known cash supply results and then deployed as trained machine learning models that perform the AI predictive and decision functions described herein.

Figure 2:
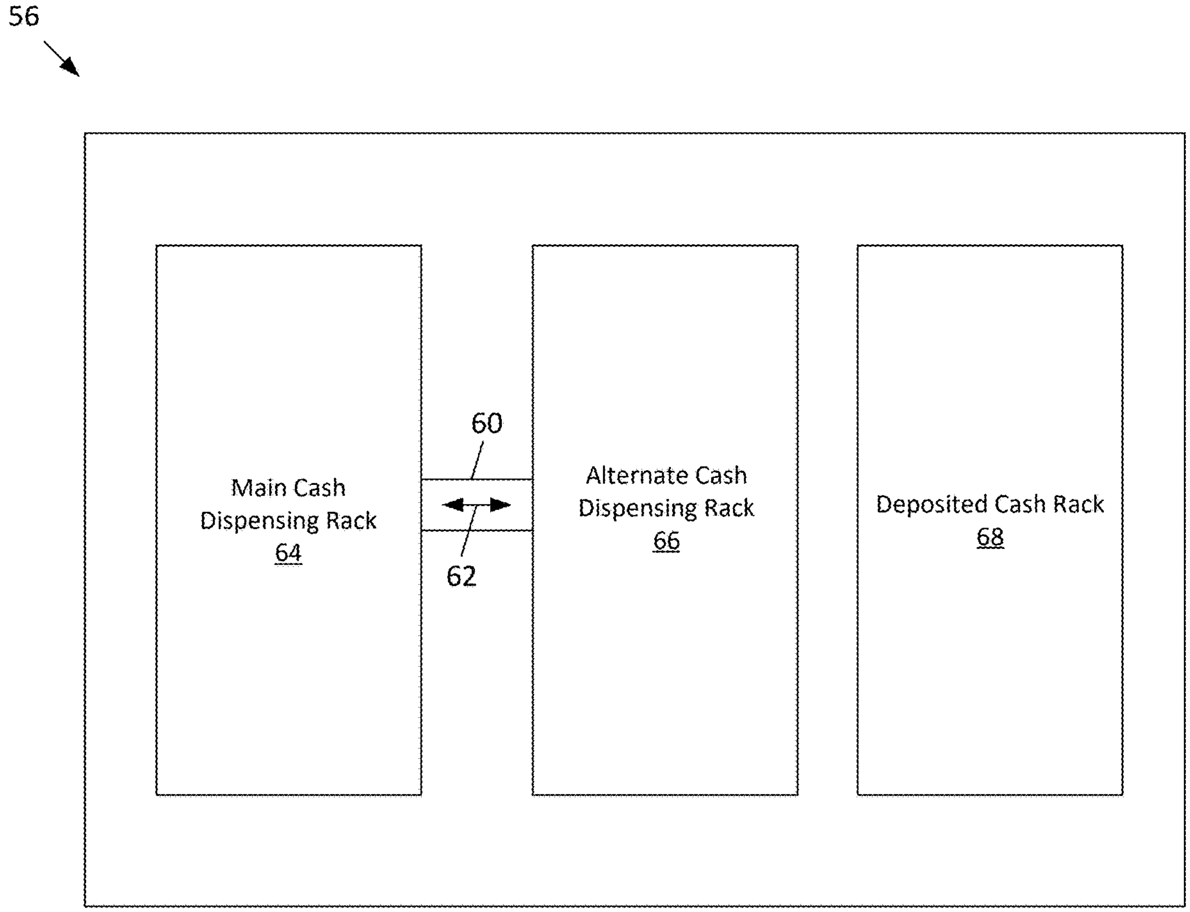
FIG. 2 shows details of a component of the system of FIG. 1.

FIG. 2 shows, as an example, details of the cash racks 56 of the system 10 of FIG. 1. The cash racks 56 include a main cash dispensing rack 64, an alternate cash dispensing rack 66, and a deposited cash rack 68.

The deposited cash rack 68 is segregated from the cash dispensing racks 64 and 66. The deposited cash rack 68 holds cash deposited into the ATM 18 via the deposit device(s) 52. Cash cannot be withdrawn from the deposited cash rack 68. Cash cannot be automatically moved from the deposited cash rack 68 to either of the cash dispensing racks 64 and 66.

The main cash dispensing rack 64 holds a supply of cash that can be withdrawn on a first come, first served basis regardless of the user requesting the withdrawal.

The alternate cash dispensing rack 66 holds a supply of cash earmarked for one or more customers whose requests to hold cash for future withdrawal have been granted, and whose requests have not yet expired.

The main cash dispensing rack 64 and the alternate cash dispensing rack 66 are operatively coupled with a conveyor 60. The conveyor 69 allows amounts of cash to be moved in either of the directions 62, e.g., from the main cash dispensing rack 64 to the deposited cash rack 68 and from the alternate cash dispensing rack 66 to the main cash dispensing rack 64, based on control signals received, via the controller 55, from the ATM control module 38.

Example Implementations

Example implementations of the components of the system of FIG. 1 will now be described.

Referring to FIGS. 1-2, a customer of the financial institution that operates the ATM 18 logs into their financial institution's customer account platform via a software application installed on their device 30. At the time the customer logs in, the smartphone is remote from (e.g., five miles away) from the ATM 18.

The customer then submits a request via the platform to hold 300 dollars at an ATM for future withdrawal from that ATM. The request identifies a transaction account that the customer has access to via the platform from which the held funds would be withdrawn. The identified transaction account currently holds 1,500 dollars. That is, the identified transaction account has sufficient liquidity for the requested future cash withdrawal.

The customer's request is transmitted from the device 30 to the server 14, together with metadata. The request itself is encoded in data that indicates to the server 14 the amount of the requested withdrawal and the account number of the transaction account from which the cash would be withdrawn.

The metadata includes a timestamp that indicates the date, day of the week, and time of day that the request was submitted. The timestamp can be generated by the device 30. The metadata can also include a geolocation of the device 30 when the request was made. For example, the geolocation can be provided as coordinates by a global positioning device embedded in the device 30.

The server 14 receives the request and metadata and, based thereon, selects a candidate ATM 18 to potentially fulfill the request. For example, the ATM 18 can be selected based on the geolocation of the device 30 at the time of the request (e.g., the ATM 18 is the nearest ATM to the device 30). In some examples, the request itself can identify a desired ATM (e.g., the ATM 18) to hold the cash.

In some examples, the server 14 selects the ATM 18 using one or more cash awareness models and/or liquidity corpus managers that have up-to-date information on current cash supplies for various ATMs in the financial institution's network. The server 14 can optimize multiple of these factors in selecting the ATM 18 as the candidate ATM to fulfill the request.

Once the ATM 18 has been identified as the candidate ATM to potentially fulfill the request, the AI components of the server 14 process various pieces of data and generate outputs that cause the ATM control module 38 to either grant or reject the request and, if granted, to set a time limit for how long the requested amount of cash will be held by the ATM 18.

The pieces of data can include, for example, the amount of cash requested to be held, the metadata, the total amount of cash currently held in the cash dispensing racks of the ATM 18, how much of the total cash is held in the rack 64 compared to the amount of cash held in the rack 66, historical cash withdrawal demand fluctuations for the ATM 18, historical cash holding requests for the ATM 18, the customer data 28, and the contextual data 29. Each piece of data can drive the AI components (e.g., via corresponding modifications to parameters of algorithms run by the AI components) to more strongly recommend either granting or rejecting the request, with the composite of the factors algorithmically generating the ultimate decision on whether to grant the request and, if so, for what time period.

Some non-limiting examples of such factor drivers will now be described.

The higher the expected cash withdrawal demand from the ATM 18 within a predefined potential cash holding period, the more likely the request is rejected. The cash withdrawal demand can be predicted based on the time-stamp, the location of the ATM 18, and an event calendar provided by the contextual data 29.

The greater the status of the relationship between the customer and the financial institution, the more likely the request is granted. Relationship status can be determined from the customer profile data in the customer data 28.

If the requested cash hold will bring the gap between the cash in the main rack and the cash in the alternate rack closer to the predefined optimal gap or optimal range of gap, the request is more likely to be granted. If the requested cash hold will bring the gap between the cash in the main rack and the cash in the alternate rack further from the predefined optimal gap or optimal range of gap, the request is more likely to be rejected.

If the customer has a history of making cash withdrawal hold requests in which the customer arrives at the selected ATM on average within a predefined amount of time (e.g., 2 hours) to withdraw the held cash, the request is more likely to be granted. If the customer has a history of making cash withdrawal hold requests in which the customer arrives at the selected ATM on average later than the predefined amount of time (e.g., 2 hours) to withdraw the held cash, the request is more likely to be rejected. This data can be provided by the customer data 28.

If the amount of cash (300 dollars in this example) requested to be held is more than a predefined threshold percentage (e.g., more than one percent) of the current cash held in the main cash dispensing rack 64, the request is more likely to be rejected.

Many other factor drivers are possible based on the various data inputs to the AI components.

Such factors can also be used to determine, for a granted request, how long the ATM 18 will hold the cash until the request expires. For instance, if the timestamp indicates the request was entered at two o'clock in the afternoon, and a spike in cash withdrawal demand is predicted to start at five o'clock in the afternoon, the request can be granted and the cash held for three hours, at which time threshold the generated token expires and the held cash is returned to the cash dispensing rack 64 for dispensing on a first come, first served basis.

If the request is granted for a predefined period of time, the token generating module 34 generates a token that expires at the end of the predefined period of time. The token can include, e.g., a one-time passcode, a quick response (QR) code, a bar code, and the like. The token is accessible via the device 30 (e.g., by logging onto the financial institution's account management platform).

Granting of the request by the server 14 causes the ATM control module 38 to generate signals that are received by the controller 55.

In some examples, these signals provide a command to the controller 55 to reserve or hold 300 dollars of the total cash supply in one or more of the cash racks until the token is provided to the ATM or the predefined time period expires.

In some examples, these signals generated by the control module 38 cause the controller 55 to move 300 dollars from the main cash dispensing rack 64 to the alternate cash dispensing rack 66 via the conveyor 60. The 300 dollars is held in the alternate cash dispensing rack 66 until the earlier of two events. If the token is provided to the ATM 18 (the QR code is scanned by the token input device 50 within the predefined time period) then the 300 dollars is dispensed from the alternate cash dispensing rack 66 to the cash dispensing device 53 during the customer's ATM session (e.g., in response to a request made by the customer via the I/O device 51 to withdraw the reserved 300 dollars).

If the token expires before it is provided to the ATM 18, then the controller 55 causes 300 dollars to move back, via the conveyor, from the alternate cash dispensing rack 66 to the main cash dispensing rack 64, such that the 300 dollars becomes available again from the main rack for cash withdrawal on a first come, first served basis.

Figure 3:
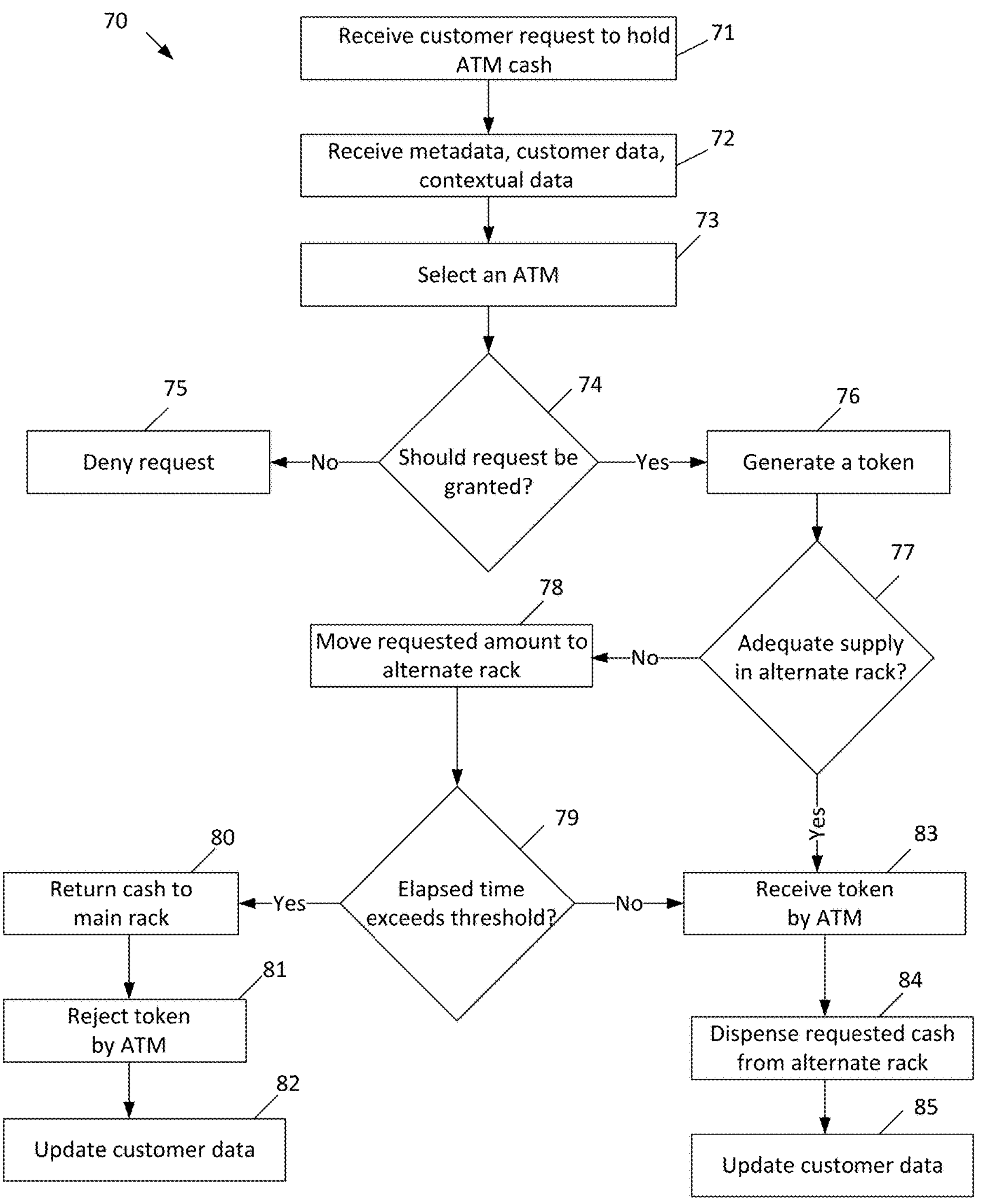
FIG. 3 shows an example method that can be performed by the system of FIG. 1.

FIG. 3 shows an example method 70 that can be performed by the system of FIG. 1.

Methods of the present disclosure can include more or fewer steps than the enumerated steps of method 70. Methods of the present disclosure can include steps of the method 70 performed in a different order than depicted. In some examples, at least some of the steps of the method 70 are performed by the server 14. In some examples, some of the steps of the method 70 are performed by one or more of the AI components of the server 14. In some examples, some of the steps of the method 70 are performed by the ATM 18.

At a step 71 of the method 70, a customer request to hold an amount of cash in an ATM is received.

At a step 72 of the method 70, metadata from the device 30, customer data 28, and contextual data 29 are received, all of which are associated with the request and/or the customer.

At a step 73 of the method 70, an ATM 18 is selected based on the data and the request provided at the steps 72 and 71, respectively.

At a step 74 of the method 70, the various data inputs are processed to determine whether the request should be granted.

If at the step 74 it is determined that the request should be rejected, then the method 70 proceeds to the step 75 at which a message is generated and transmitted that can be viewed on the device 30, the message indicating that the request to hold ATM cash has been denied.

If at the step 74 it is determined that the request is granted then the method 70 proceeds to the step 76, at which a token is generated.

At a step 77, it is determined if there is adequate cash supply in the alternate cash dispensing rack 66 to fulfill the cash hold request amount.

If at the step 77 it is determined that there is already adequate cash supply in the alternate cash dispensing rack 66 that is not already reserved for another customer's withdrawal then the method 70 proceeds to the step 83 at which the token is received (e.g., scanned) by the ATM 18.

From the step 83 the method 70 proceeds to the step 84 at which the ATM 18 dispenses the held amount of cash from the alternate cash dispensing rack 66.

From the step 84, the method 70 proceeds to the step 85 at which the customer data 28 is updated to include an historical record of the customer's cash hold request and information about the fulfillment of the request.

If at the step 77 it is determined that there is not already adequate cash supply in the alternate cash dispensing rack 66 to fulfill the granted hold request, then the method 70 proceeds to the step 78 at which the requested amount of cash is moved from the main cash dispensing rack 64 to the alternate cash dispensing rack 66.

The method 70 then proceeds to the step 79 at which it is determined if the predefined period of time has elapsed since the token was generated at the step 76.

If at the step 79 it is determined that the predefined period of time has not elapsed (e.g., the token has not yet expired), the method 70 proceeds to the steps 83, 84, and 85 as described above.

If at the step 79 it is determined that the predefined period of time has elapsed (e.g., the token has expired), the method 70 advances to the step 80 at which the cash that had been moved to the alternate cash dispensing rack 66 is returned to the main cash dispensing rack 64.

The method 70 then proceeds to the step 81 at which the token generated at the step 76 is rejected by the ATM 18 and/or expires.

The method 70 then proceeds to the step 82 at which the customer data 28 is updated to include an historical record of the customer's cash hold request and information about the non-fulfillment of the request.

Example Computing Environment

Figure 4:
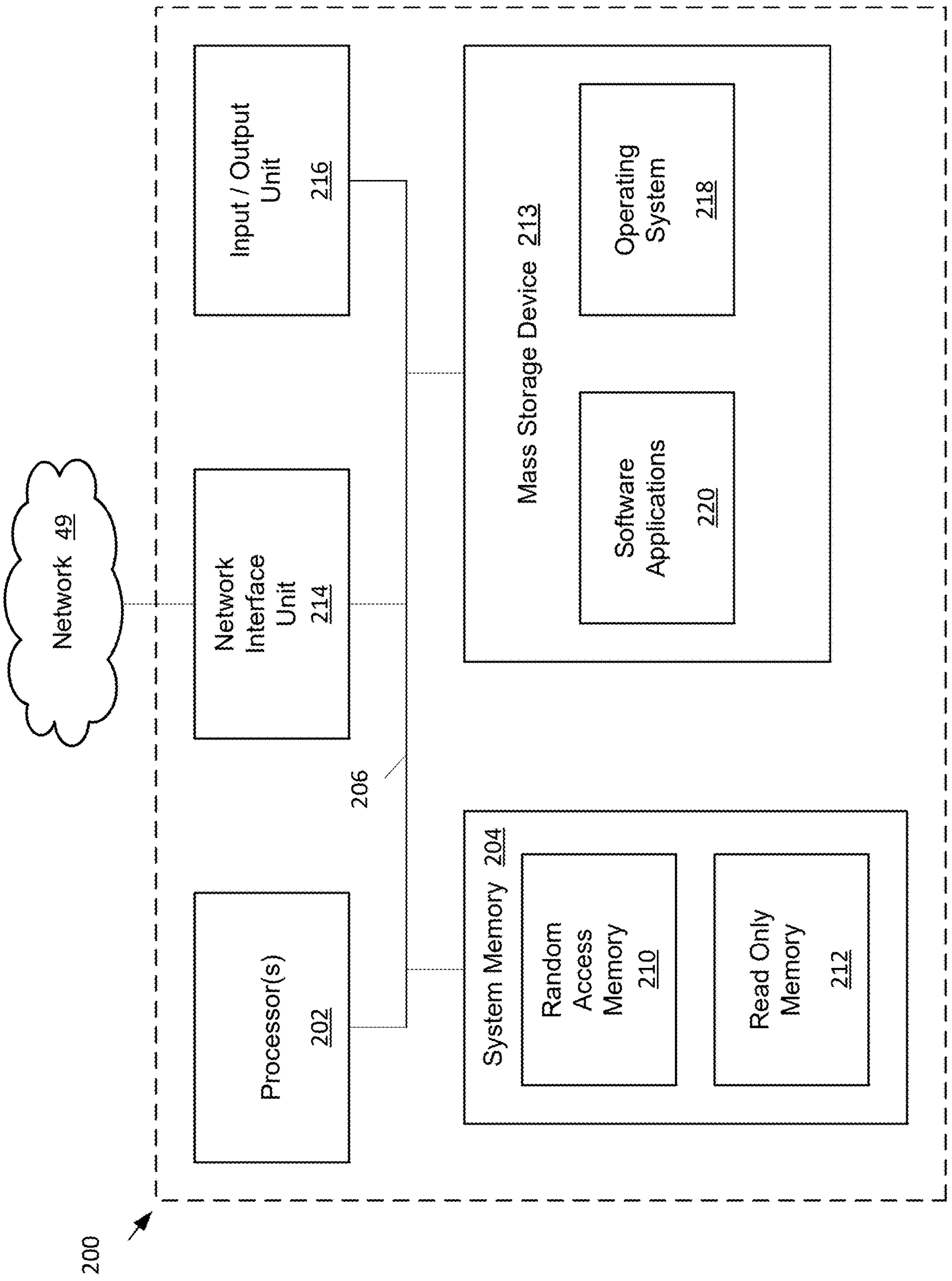
FIG. 4 shows example physical components of portions of the system of FIG. 1.

Additional components of the system 10 of FIG. 1 are illustrated in FIG. 4.

The electronic computing device 200 can correspond to any of the server 14, the customer electronic computing device 30, or the ATM 18 of the system 10 of FIG. 1. Components of the computing device 200 can correspond to other components of the system 10 of FIG. 1, such as the database(s) 27.

When the computing device 200 corresponds to the server 14, the computing device 200 can be an internally controlled and managed device (or multiple devices) of an enterprise, e.g., a financial institution that offers various banking services to its customers. Alternatively, the computing device 200 can represent one or more devices operating in a shared computing system external to the enterprise, such as a cloud.

Via the network 49, any components of the computing device 200 that are physically remote from one another can interact with one another, as well as with other computing resources, such as those shown in FIG. 1. The network 49 can be any suitable wired, wireless, cellular or other data network (or combination of networks) that enables data transmission between computing devices networked together.

The electronic computing device 200 includes one or more processors 202. The one or more processors 202 are configured to carry out the functionality of the system 10 described above by executing computer-readable instructions stored on non-transitory computer-readable storage. The electronic computing device 200 also includes a system memory 204 and a system bus 206 that couples the system memory 204 to the processor(s) 202.

The system memory 204 includes a random access memory ("RAM") 210 and a read-only memory ("ROM") 212. A basic input/output system that contains the basic routines that help to transfer information between elements within the electronic computing device 200, such as during startup, is stored in the ROM 212.

The electronic computing device 200 further includes a mass storage device 213. The mass storage device 213 is able to store software instructions and data such as the customer data 28, the GAN 37, the multi-head attention module 36, the token generating module 34 and the support vector machine 35, as well any other instructions needed to carry out any further functions of the devices of the system 10 of FIG. 1.

The mass storage device 213 is connected to the processor(s) 202 through a mass storage controller (not shown) connected to the system bus 206. The mass storage device 213 and its associated computer-readable data storage media provide non-volatile, non-transitory storage for the computing device 200. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the computing device 200.

According to various embodiments of the invention, the computing device 200 may operate in a networked environment using logical connections to remote network devices (such as other computing devices of the system of FIG. 10) through the network 49, such as a wireless network, the internet, or another type of network. The electronic computing device 200 may connect to the network 49 through a network interface unit 214 connected to the system bus 206. It should be appreciated that the network interface unit 214 may also be utilized to connect to other types of networks and remote computing systems. The electronic computing device 200 also includes an input/output unit 216 for receiving and processing input from a number of other devices, including a touch user interface display screen, an audio input device, or another type of input device, such as a QR code scanner a transaction card reader, and the like.

As mentioned briefly above, the mass storage device 213 and/or the RAM 210 of the electronic computing device 200 can store software instructions and data. The software instructions include an operating system 218 suitable for controlling the operation of the electronic computing device 200. The mass storage device 213 and/or the RAM 210 also store software instructions and applications 220, that when executed by the processor(s) 202, cause the electronic computing device 200 to provide functionality of the system 10 described above (FIG. 1).

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. An automatic teller machine (ATM), comprising:

a first cash rack;

a second cash rack; and a cash dispensing device configured to dispense cash from each of the first cash rack and the second cash rack, wherein the ATM is configured to move an amount of cash from the first cash rack to the second cash rack in response to:

(i) a request to hold cash for later withdrawal received from an electronic computing device that is remote from the ATM; and (ii) an approval of the request by a generative adversarial network (GAN), the approval being based on an output of a multi-head attention module, wherein one head of the multi-head attention module is associated with the first cash rack, and wherein another head of the multi-head attention module is associated with the second cash rack such that the one head and the another head process, respectively, data that impacts cash supplies of corresponding ones of the first cash rack and the second cash rack of the ATM, respectively.

2. The ATM of claim 1, wherein the ATM is configured to return the amount of cash from the second cash rack to the first cash rack in response to an event.

3. The ATM of claim 2, wherein the event includes an elapsing of a predefined period of time since the request to hold cash was received.

4. The ATM of claim 1, wherein the GAN is configured to pit a predicted cash supply of the first cash rack against a predicted cash supply of the second cash rack.

5. The ATM of claim 1, wherein the approval is valid for a period of time defined by the GAN.

6. The ATM of claim 1, wherein the ATM is configured to move the amount of cash from the first cash rack to the second cash rack further in response to:

(iii) an output from a support vector machine (SVM).

7. The ATM of claim 6, wherein the output from the SVM is constrained by a rule defining a range of a gap that must be maintained between a first amount of cash held in the first cash rack and a second amount of cash held in the second cash rack.

8. The ATM of claim 1, wherein the GAN is configured to determine whether to approve the request based on contextual data associated with the request.

9. The ATM of claim 8, wherein the contextual data indicates an occurrence of an event associated with a predicted cash withdrawal demand that is in excess of a predefined threshold cash withdrawal demand.

10. The ATM of claim 1, wherein the GAN is configured to determine whether to approve the request based on a profile of a customer.

11. A system for dispensing cash, comprising:

an automatic teller machine (ATM) holding a total amount of cash, the ATM including:

a first cash rack;

a second cash rack; and a cash dispensing device configured to dispense cash from each of the first cash rack and the second cash rack;

at least one processor; and non-transitory computer-readable storage encoding instructions which, when executed by the at least one processor cause the system to:

receive an input from an electronic computing device that is remote from the ATM, the input including a request to hold for later withdrawal another amount of cash and metadata associated with the request, the metadata including a time that the request was made, a location of the electronic computing device, and a profile of a customer of a financial institution that operates the ATM;

select from a plurality of ATMs, based on the metadata and the total amount of cash, the ATM as a selected ATM to hold the another amount of cash;

feed the request and the metadata to a generative adversarial network (GAN); and determine, by the GAN, whether to approve the request based on an output of a multi-head attention module, wherein one head of the multi-head attention module is associated with the first cash rack, and wherein another head of the multi-head attention module is associated with the second cash rack such that the one head and the another head process, respectively, data that impacts cash supplies of corresponding ones of the first cash rack and the second cash rack of the ATM, respectively.

12. The system of claim 11, wherein the GAN is configured to determine whether to approve the request based on:

the metadata;

the total amount of cash; and the another amount of cash.

13. The system of claim 11, wherein the non-transitory computer-readable storage encodes further instructions which, when executed by the at least one processor cause the system to:

when the GAN approves the request:

generate a token; and send the token to the electronic computing device.

14. The system of claim 13, wherein the non-transitory computer-readable storage encodes further instructions which, when executed by the at least one processor cause the system to:

send signals to the ATM that cause the ATM to prevent the another amount of cash from moving out of the second cash rack until:

i) the token is scanned by the ATM; or ii) a predefined amount of time since the token was generated has elapsed.

15. The system of claim 14, wherein the predefined amount of time is determined by the GAN.

16. The system of claim 11, wherein the non-transitory computer-readable storage encodes further instructions which, when executed by the at least one processor cause the system to:

when the GAN approves the request:

move the another amount of cash from the first cash rack to the second cash rack based on another output from a support vector machine (SVM).

17. The system of claim 16, wherein the another output is constrained by a rule defining a range of a gap that must be maintained between a first amount of the total amount of cash held in the first cash rack and a second amount of the total amount of cash held in the second cash rack.

18. The system of claim 11, wherein the non-transitory computer-readable storage encodes further instructions which, when executed by the at least one processor cause the system to:

when the GAN does not approve the request to withdraw the another amount of cash, send a message to the electronic computing device indicating that the request to withdraw the another amount of cash is denied.

* * * * *